US012026917B2

(12) United States Patent
Berestov et al.

(10) Patent No.: US 12,026,917 B2
(45) Date of Patent: Jul. 2, 2024

(54) METHOD OF 3D RECONSTRUCTION OF DYNAMIC OBJECTS BY MOBILE CAMERAS

(71) Applicants: SONY GROUP CORPORATION, Tokyo (JP); Sony Corporation of America, New York, NY (US)

(72) Inventors: Alexander Berestov, San Jose, CA (US); Cheng-Yi Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 23 days.

(21) Appl. No.: 17/702,030

(22) Filed: Mar. 23, 2022

(65) Prior Publication Data
US 2023/0306640 A1 Sep. 28, 2023

(51) Int. Cl.
*G06T 7/00* (2017.01)
*G06T 7/73* (2017.01)
*G06T 13/40* (2011.01)
*G06T 17/20* (2006.01)

(52) U.S. Cl.
CPC .................. *G06T 7/97* (2017.01); *G06T 7/74* (2017.01); *G06T 13/40* (2013.01); *G06T 17/20* (2013.01); *G06T 2207/10032* (2013.01); *G06T 2207/20044* (2013.01)

(58) Field of Classification Search
None
See application file for complete search history.

(56) References Cited

U.S. PATENT DOCUMENTS

2018/0231972 A1* 8/2018 Woon .................. G08G 5/0069
2018/0302572 A1 10/2018 Barns
2019/0377345 A1* 12/2019 Bachrach ............. G05D 1/0094
(Continued)

FOREIGN PATENT DOCUMENTS

CN 111199576 A 5/2020

OTHER PUBLICATIONS

Hornung, A., Dekkers, E., and Kobbelt, L. "Character animation from 2D pictures and 3D motion data", ACM Trans. Graph. 26, 1, Article 1 (Jan. 2007), 9 pages. DOI = 10.1145/1186644.1186645 http://doi.acm.org/10.1145/1186644.1186645 (Year: 2007).*
(Continued)

*Primary Examiner* — Tize Ma
(74) *Attorney, Agent, or Firm* — Haverstock & Owens, A Law Corporation (57) ABSTRACT

A method of 3D motion reconstruction of outdoor, highly flexible moving subjects with multiple cameras on drones is described herein. A multi-drone capturing system is used to remove the restriction of a dedicated virtual reality shooting place, "the hot seat," so that the actor/target is able to perform agile or long-distance activities outdoor. The subject's 3D pose parameters are estimated by the captured multi-view images by the drones, and the sequence of poses becomes the motion in time to control the animation of a pre-built 3D model. The method is able to be directly integrated into an existing Virtual Reality/Augmented reality (VR/AR) production chain, and the subject is able to be extended to animals that are difficult to be contained in a VR camera mesh space.

22 Claims, 9 Drawing Sheets

(56) References Cited

U.S. PATENT DOCUMENTS

2020/0365042 A1* 11/2020 Mahalingam ........ G08G 5/0069
2023/0157539 A1* 5/2023 Berger ................ G02C 13/005
　　　　　　　　　　　　　　　　　　　　　　　351/209

OTHER PUBLICATIONS

Tobias Nägeli et al, "Flycon: Real-time Environment-independent Multi-view Human Pose Estimation with Aerial Vehicles", ACM Transactions on Graphics, vol. 37, No. 6, Article 182. Publication date: Nov. 2018 (Year: 2018).*

Simon Mentasti et al., "Controlling the Flight of a Drone and Its Camera for 3D Reconstruction of Large Objects", Received: Mar. 6, 2019, Accepted: May 16, 2019; Published: May 21, 2019, Sensor 2019, 19, 233; dio.10.3390, www.mdpi.com/journal/sensors, pp. 1-15.

* cited by examiner

Marker-based

Full Body

Body Parts

Marker-less

Face

Fig. 6

Examples of Side Camera Positions

Example of N=3 cameras

METHOD OF 3D RECONSTRUCTION OF DYNAMIC OBJECTS BY MOBILE CAMERAS

FIELD OF THE INVENTION

The present invention relates to three dimensional reconstruction. More specifically, the present invention relates to three dimensional reconstruction using mobile cameras.

BACKGROUND OF THE INVENTION

Visual effects are fancy and ubiquitous nowadays but not efficient in movie production. The cost is huge, and the development time is lengthy. Existing system of three dimensional motion capturing require the motions to be limited in space covered by a fixed camera mesh.

SUMMARY OF THE INVENTION

A method of 3D motion reconstruction of outdoor, highly flexible moving subjects with multiple cameras on drones is described herein. A multi-drone capturing system is used to remove the restriction of a dedicated virtual reality shooting place, "the hot seat," so that the actor/target is able to perform agile or long-distance activities outdoor. The subject's 3D pose parameters are estimated by the captured multi-view images by the drones, and the sequence of poses becomes the motion in time to control the animation of a pre-built 3D model. The method is able to be directly integrated into an existing Virtual Reality/Augmented reality (VR/AR) production chain, and the subject is able to be extended to animals that are difficult to be contained in a VR camera mesh space.

In one aspect, a method comprises obtaining a 3D model of a subject generated using a multi-view capturing system, capturing motion of the subject while the subject is moving with a plurality of drones, estimating pose parameters of the subject using the captured motion from the plurality of drones and applying the pose parameters to animate the 3D model. The method further comprises positioning the subject within views of the plurality of drones by implementing 3D positioning directly. The method further comprises positioning the subject within views of the plurality of drones by implementing 3D positioning indirectly from 2D. The method further comprises using prediction to predict a future location of the subject to determine where to position the plurality of drones. The method further comprises collecting the captured motion from the plurality of drones at a ground control station. The ground control station receives videos, positions, and timestamps from the plurality of drones, and sends any controlling or correction commands to the plurality of drones. The method further comprises controlling drone formation of the plurality of drones with a ground control station. The method further comprises controlling drone formation of the plurality of drones with a tracking drone of the plurality of drones. Each camera of each drone of the plurality of drones is configured to broadcast absolute positions to all other cameras.

In another aspect, an apparatus comprises a non-transitory memory for storing an application, the application for: obtaining a 3D model of a subject, receiving captured motion of the subject while the subject is moving from a plurality of drones, estimating pose parameters of the subject using the captured motion from the plurality of drones and applying the pose parameters to animate the 3D model and a processor coupled to the memory, the processor configured for processing the application. The application is further configured for positioning the subject within views of the plurality of drones by implementing 3D positioning directly. The application is further configured for positioning the subject within views of the plurality of drones by implementing 3D positioning indirectly from 2D. The application is further configured for using prediction to predict a future location of the subject to determine where to position the plurality of drones. The apparatus receives videos, positions, and timestamps from the plurality of drones, and sends any controlling or correction commands to the plurality of drones. The application is further configured for controlling drone formation of the plurality of drones.

In another aspect, a system comprises a plurality of drones configured for capturing motion of a subject while the subject is moving and a ground control station configured for: obtaining a 3D model of the subject generated using a multi-view capturing system, estimating pose parameters of the subject using the captured motion from the plurality of drones and applying the pose parameters to animate the 3D model. Each drone of the plurality of drones is equipped with at least one RGB camera device, wherein a camera's orientation is controllable by a gimbal attached to each drone of the plurality of drones. The plurality of drones are configured for positioning the subject within views of the plurality of drones by implementing 3D positioning directly. The plurality of drones are configured for positioning the subject within views of the plurality of drones by implementing 3D positioning indirectly from 2D. The plurality of drones are configured for using prediction to predict a future location of the subject to determine where to position the plurality of drones. The ground control station is configured for collecting the visual data from the plurality of drones. The ground control station is configured to receive videos, positions, and timestamps from the plurality of drones, and send any controlling or correction commands to the plurality of drones. The ground control station is configured to control drone formation of the plurality of drones. A tracking drone of the plurality of drones is configured for controlling drone formation of the plurality of drones. Each camera of each drone of the plurality of drones is configured to broadcast absolute positions to all other cameras.

DETAILED DESCRIPTION OF THE PREFERRED EMBODIMENT

A method of drone-based 3D motion reconstruction of outdoor, highly flexible moving subjects with multiple cameras on drones is described herein. A multi-drone capturing system is used to remove the restriction of a dedicated virtual reality shooting place, "the hot seat," so that the actor/target is able to perform agile or long-distance activities outdoor. The subject's 3D pose parameters are estimated by the captured multi-view images by the drones, and the sequence of poses becomes the motion in time to control the animation of a pre-built 3D model. The method is able to be directly integrated into an existing Virtual Reality/Augmented reality (VR/AR) production chain, and the subject is able to be extended to animals that are difficult to be contained in a VR camera mesh space.

The drone-based 3D motion reconstruction method includes obtaining or generating a 3D model of a subject using a stationary multi-view capturing system; performing motion capture of moving subjects using multiple drones; and applying the captured motion to animate the 3D model. Multiple cameras on unmanned aerial vehicles (e.g., drones) or another mobile device are used for 3D model control. A drone swarm (e.g., set of multiple drones) each carrying a camera is configured to track, follow, and capture the subject from multiple views. The subject is able to move and perform freely, either indoor or outdoor. The subject is also able to interact with gadgets which was not allowed in the current camera mesh space. Each drone is able to determine its next pose in real-time by itself using only the broadcasted subject position. The whole swarm formation guarantees no opposite facing drone pairs to prevent an ill-posed 3D pose estimation.

Figure 1:
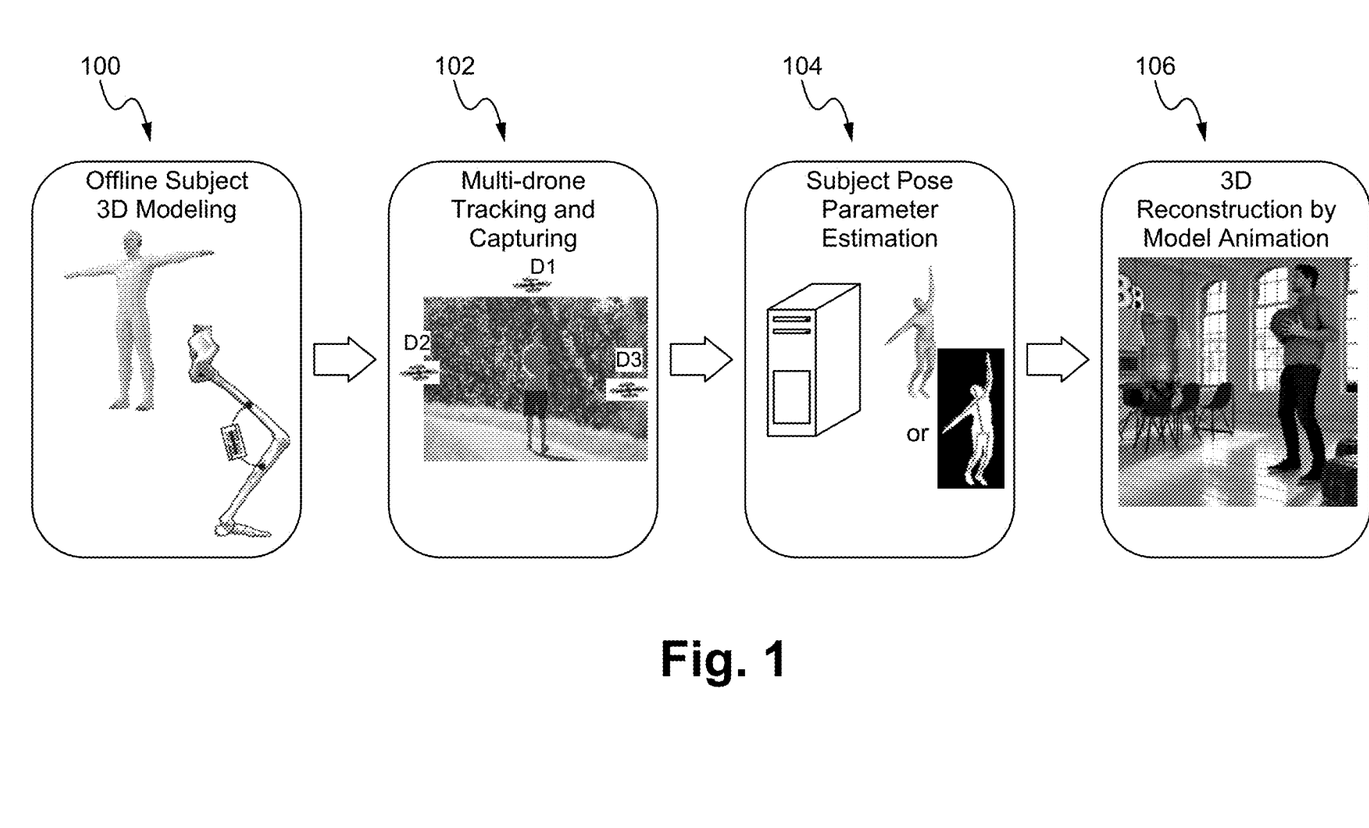
FIG. 1 illustrates a diagram of a method of a 3D model controlled by multi-drone capturing according to some embodiments.

FIG. 1 illustrates a diagram of a method of a 3D model controlled by multi-drone capturing according to some embodiments. In the step 100, offline subject 3D modeling is implemented to obtain the 3D model of the subject and other individual traits such as the biomechanical constraints. In the step 102, multi-drone tracking and capturing is implemented. At least two drones are used to capture the subject's videos from different viewpoints. Although a drone swarm is described herein as the mobile platform of cameras, the mobile platform may be replaced with other groups of movable devices satisfying the communication and control prerequisites. In the step 104, subject pose parameter estimation is implemented by using the visual data from all drones to estimate the 3D subject pose parameters. In the step 106, 3D reconstruction by model animation is performed. The 3D subject pose parameters are for rendering the subject in AR/VR. In some embodiments, fewer or additional steps are implemented. In some embodiments, the order of the steps is modified.

A Ground Control Station (GCS) is used for collecting the data from each drone and performing subject pose parameter estimation for 3D model control. Drone formation control is able to be done on the GCS or a specific tracking drone to compute and send data or commands for positioning each drone. A multi-drone framework is discussed in U.S. patent application Ser. No. 16/917,013, filed Jun. 30, 2020, titled "SYSTEM OF MULTI-DRONE VISUAL CONTENT CAPTURING," which is hereby incorporated by reference in its entirety for all purposes.

A wireless communication is established between the drones and a GCS, while it is not restricted to any specific wireless protocol. The GCS receives the drone videos, positions, and timestamps, and sends any controlling or correction commands to any drones.

Absolute drone positioning is able to be done by Real-Time Kinematic GPS (RTK-GPS) and Inertial Measurement Unit (IMU) or by additional devices such as using Ultra-Wide Band (UWB) for a GPS-denied environment. Given the position of a subject and the expected viewing direction of a drone camera, the drone is able to move its position and rotate the gimbal to meet the expected camera position and the optical axis direction.

Each drone has at least one RGB camera (or another type of camera) for video capturing. A camera's orientation is controllable by a gimbal attached to a drone. Any additional hardware is able to be implemented to enable drone and/or camera movement. Setting an RGB camera's pose includes all the steps from drone positioning to gimbal rotating. Each camera is able to broadcast its absolute positions to all other cameras/drones at any time. Drone positioning to position multiple drones given the know subject position is discussed in U.S. patent application Ser. No. 16/917,671, filed Jun. 30, 2020, titled "METHOD OF MULTI-DRONE CAMERA CONTROL," which is hereby incorporated by reference in its entirety for all purposes.

Figure 2:
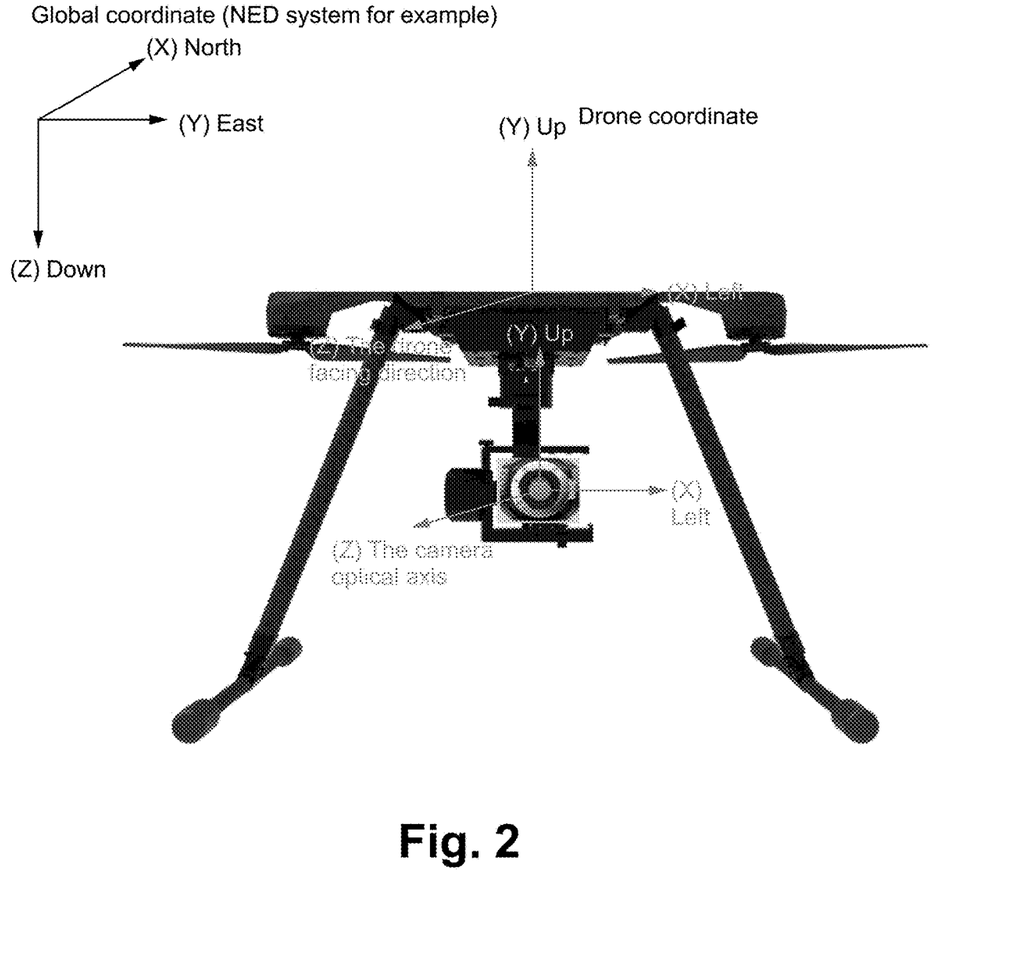
FIG. 2 illustrates a diagram of a drone and a coordinate system according to some embodiments.

FIG. 2 illustrates a diagram of a drone and a coordinate system according to some embodiments. The exemplary coordinate system is North, East and Down (NED). The global coordinate is a fixed 3D coordinate in the real world. It is able to be any predefined coordinate system or a customized coordinate. The drone coordinate is defined on the drone, which is dynamic with respect to the global coordinate. The camera coordinate is defined on the camera attached to a rotatable gimbal, and the gimbal is fixed on the drone. Therefore, the camera coordinate is relatively fixed to the drone coordinates. There is also a 2D image coordinate defined on the camera sensor. It is fixed to the camera coordinates. Image coordinates are able to be fully derived from the camera coordinates. In some embodiments, the coordinates are not fixed and are of a dynamic nature.

Figure 3:
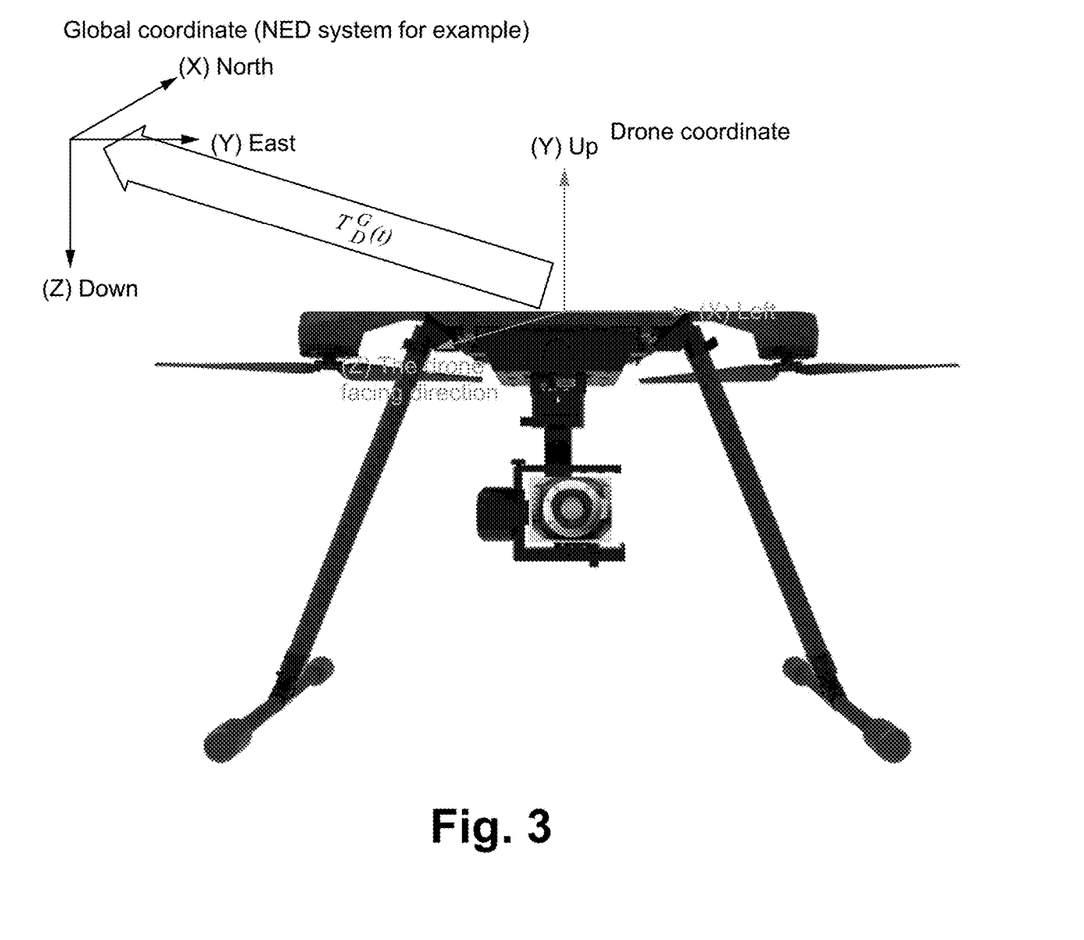
FIG. 3 illustrates a diagram of a drone and a coordinate system according to some embodiments.

FIG. 3 illustrates a diagram of a drone and a coordinate system according to some embodiments. A drone's position in the global coordinates is available either by GPS or any existing drone positioning methods. The orientation is able to be represented in three rotation angles with respect to the global coordinates: $\alpha_D^G(t)$, $\beta_D^G(t)$, $\gamma_D^G(t)$, where $\alpha_D^G(t)$, $\beta_D^G(t)$, $\gamma_D^G(t)$, are the rotation angles around axis X, Y and Z, respectively. A 3D rigid transform $T_D^G(t)$ from the drone coordinate to the global coordinate at any time t is derived from the above position and orientation measures.

Figure 4:
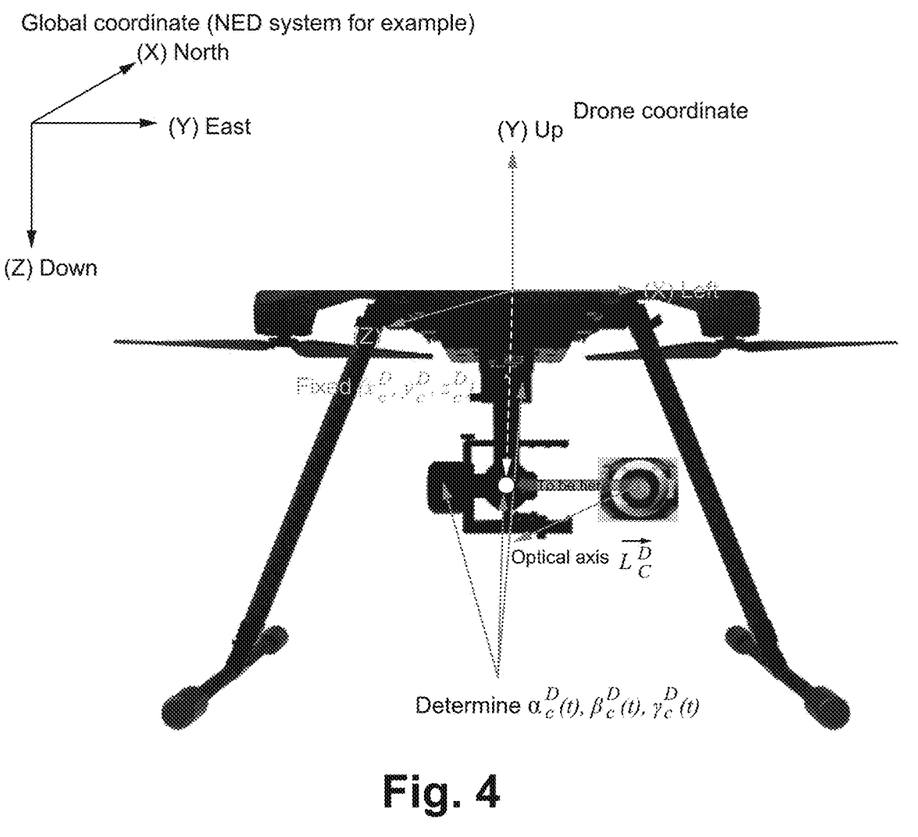
FIG. 4 illustrates a diagram of a drone and a coordinate system according to some embodiments.

FIG. 4 illustrates a diagram of a drone and a coordinate system according to some embodiments. The camera is attached on a rotatable gimbal. Camera position to the drone $(x_c^D, y_c^D, z_c^D)$ is fixed and time invariant. Camera orientation to the drone $\alpha_c^D(t)$, $\beta_c^D(t)$, $\gamma_c^D(t)$ is controlled by the rotations about the gimbal axes. The direction of camera optical axis in the drone coordinate, $\overrightarrow{L_e^D(t)}$, is able to be determined by $\alpha_c^D(t)$, $\beta_c^D(t)$, $\gamma_c^D(t)$. By above, a camera's pose $P_c^D(t)$ in the drone's local coordinate at time t is $(x_c^D, y_c^D, z_c^D, \alpha_c^D(t), \beta_c^D(t), \gamma_c^D(t))$. Given $T_D^G(t)$, $\overrightarrow{L_c^D(t)}$ is able to be transformed to the global coordinate as $\overrightarrow{L_c^G(t)}$, and $P_c^D(t)$ to the camera's global pose $P_c^G(t)$ as $(x_c^G(t), y_c^G(t), z_c^G(t), \alpha_c^G(t), \beta_c^G(t), \gamma_c^G(t),)$. $\overrightarrow{L_c^G}$ is normalize to have unit length and determines $(\alpha_c^G(t), \beta_c^G(t), \gamma_c^G(t))$.

Figure 5:
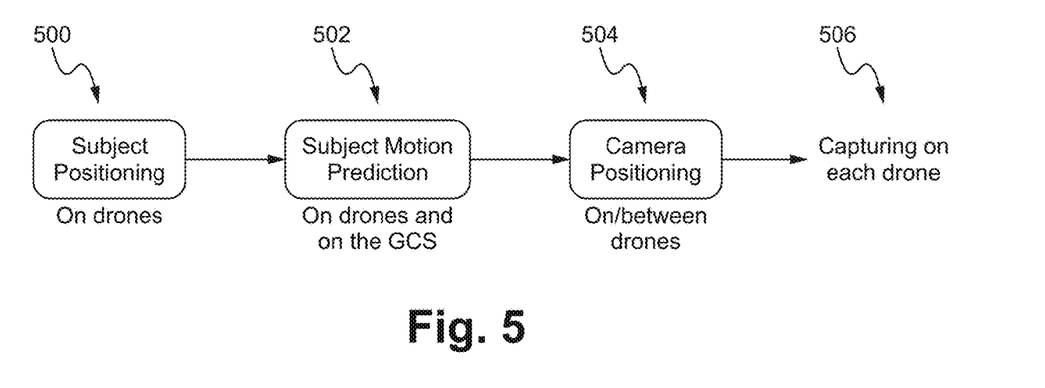
FIG. 5 illustrates a flowchart of a method of multi-drone tracking and capturing according to some embodiments.

FIG. 5 illustrates a flowchart of a method of multi-drone tracking and capturing according to some embodiments. In the step 500, subject positioning is implemented in the drones. The subject is positioned in 3D either by implementing 3D positioning directly or implementing 3D positioning indirectly from 2D. Subject positioning includes framing the subject within the drones' cameras' views, so that the drones are able to capture content of the subject. In the step 502, subject motion prediction is performed. The subject motion prediction is able to be performed on the drones and/or on the GCS. The prediction is able to be performed by sequential pose estimations. For example, the next subject position is predicted, and then the next appropriate camera positions are determined/predicted. By performing subject prediction, the flight of the drones is able to be smoother, and the subject is able to be better centered in the videos. In the step 504, camera positioning is performed. Camera positioning (or calibration) is performed on/between the drones. The real camera positioning includes moving the drone to the predicted camera positions. Each camera's position is fine tuned by the residual between the captured subject image and the expected subject image. Each camera and/or the GCS know the positions of the others cameras in real-time. In the step 506, each drone captures content (e.g., video) of the subject from its respective angle. In some embodiments, fewer or additional steps are implemented. In some embodiments, the order of the steps is modified.

Subject positioning is implemented on each of the drones. The position is $P_{sub}(t)=(X_{sub}(t), Y_{sub}(t), Z_{sub}(t))$ of the subject at time t in the global coordinates. $P_{sub}(t)$ is defined on a reference point of the subject. Examples of the reference point includes, but is not limited to: a character point on the face such as the nose; a character part of the body such as the hip; a character point on a gadget attached to the subject, such as a marker or bulb on the helmet; the 3D centroid point of the subject's volume or the head volume; or the point of a sensor or a marker having specific spatial relations to the subject.

Embodiments of directly positioning $P_{sub}(t)$ in 3D by each drone include: a RTK-GPS receiver carried by the subject; a wireless (e.g., UWB) transmitter carried by the subject; radar or LiDAR positioning methods; or RGB-D or stereo cameras. The wireless transmitter periodically broadcasts its beacons, and more than three receivers are able to determine the transmitter's position in 3D.

Embodiments of indirectly positioning 3D $P_{sub}(t)$ from 2D include using a full body 2D detector or 2D part detectors and trackers, and one is able to use either marker-based or marker-less methods. For marker-based methods, one puts the marker(s), which are detectable by the imaging devices on the drone, on the subject's body. The markers are able to be positioned in 2D images in such methods. For marker-less methods, positions are detected of either the subject's full body or parts of the subject's body, and the area/position of the parts in a 2D image are reported. $P_{sub}(t)$ projected in 2D is defined as some specific position such as the neck joint, a specific marker, or the mass center of the full body in the image coordinate. Face position is an example of a 2D part detector and tracker.

Figure 6:
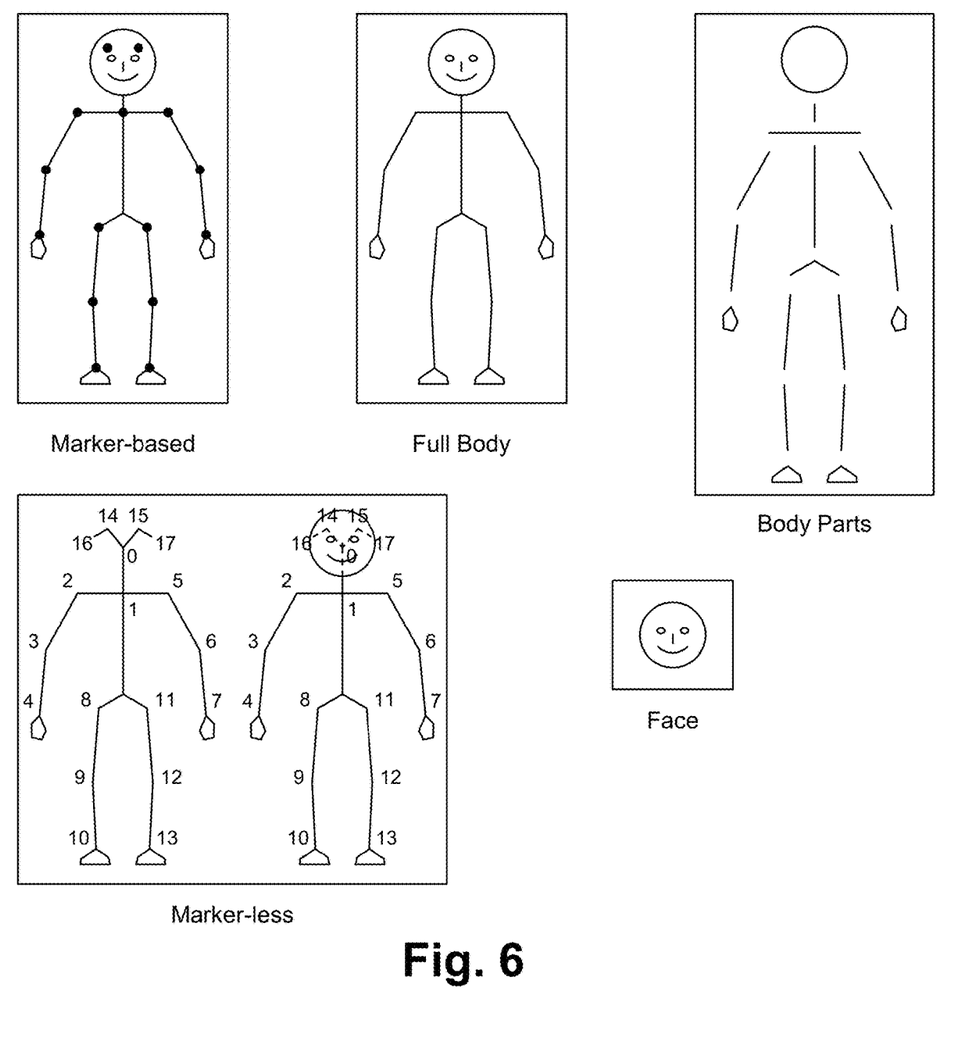
FIG. 6 illustrates examples of embodiments of indirectly positioning 3D Psub(t) from 2D according to some embodiments.

FIG. 6 illustrates examples of embodiments of indirectly positioning 3D $P_{sub}(t)$ from 2D according to some embodiments. As described above, the examples include marker-based, full body, body parts, marker-less, and face positioning.

3D $P_{sub}(t)$ from 2D includes several implementations or steps. The 2D positional estimates and the current camera pose from each drone are sent to the GCS and/or a specific tracking drone. 3D $P_{sub}(t)$ is able to be estimated by optimizing the 2D reprojection errors on each drone camera image, or by a Deep Neural Network (DNN) regression model giving the 2D positions and camera poses. A sequence of the estimated $P_{sub}(t)$ values are able to be used for prediction.

Tracking and prediction for 2D and 3D subject positioning includes 2D tracking on each drone for faster detection and 3D tracking on the GCS and/or a specific tracking drone for subject position prediction.

For 2D tracking on each drone, options include: a visual tracker such as optical flow or template matching; statistical filtering such as the Kalman filter and its variants or a particle filter; learning-based methods such as the correlation kernel filter (CKF) and its variants. In any way, the 2D positioning at time t will use the prediction position at time t−1 as a priori.

3D tracking and prediction on the GCS or a specific tracking drone exploits the history of $P_{sub}$ including the latest $P_{sub}(t)$, the tracking and prediction is able to be done by statistical filtering such as the Kalman filter or its variants or particle filter; the prediction is also able to be done by DNN models trained for position prediction, especially the variants of RNN sequential models. At the end of tracking, t←t+1 is updated, and broadcast the prediction $\hat{P}_{sub}(t)$ to all drones so they can control their motion smoothly following the subject.

An important aspect of multi-drone tracking and capturing is camera positioning. Given $\hat{P}_{sub}(t)$, multiple drones with cameras are positioned. As described herein, the application titled, "Method of Multi-Drone Camera Control," discusses a method to position multiple drones with cameras given $\hat{P}_{sub}(t)$. In some embodiments, a centralized camera positioning implementation of multiple drones is used, and in some embodiments, a distributed camera positioning implementation of multiple drones is used. The drone swarm formation described herein is not restricted. In some embodiments, three or more drones is implemented. In some embodiments, a specific fast swarm formation for subject pose capturing is implemented.

Figure 7:
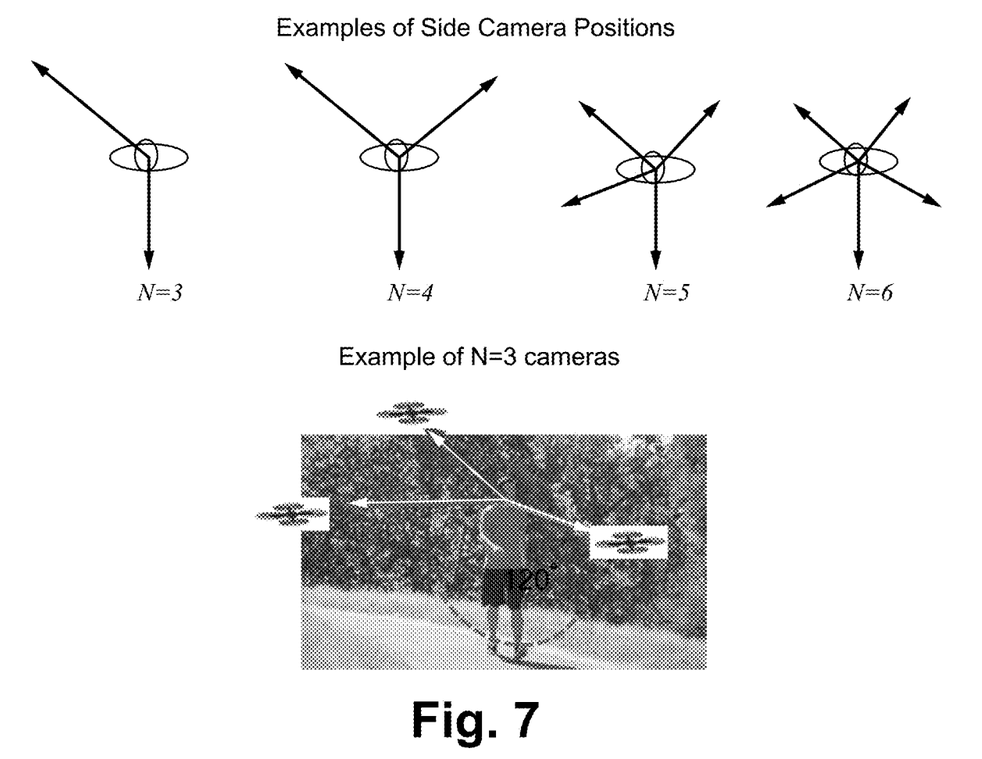
FIG. 7 illustrate exemplary diagrams of multiple drones positioned at varying angles according to some embodiments.

A fast swarm formation method is able to be used for subject pose capturing. A drone is able to be positioned above(called the "top camera") while more drones are around the side of the subject. For each drone, a prediction $\hat{P}_{sub}(t)=(X_{sub}(t), Y_{sub}(t), Z_{sub}(t))$ is received from the GCS or the top drone. For the calculations, it is assumed there are a total of N drone cameras to be positioned. The process starts with the top camera (first camera) positioning: $(x_c^G(t), y_c^G(t), z_c^G(t))=(X_{sub}(t), Y_{sub}(t), Z_{sub}(t))+\bar{Z}$, $\bar{Z}=(x, y, z)$.

$\overrightarrow{L_c^G(t)}=-\bar{Z}/\bar{Z}$, which determines $(\alpha_c^G(t), \beta_c^G(t), \gamma_c^G(t))$ of the top of the camera, where (x, y, z) is in the exemplar global NED coordinate. (x, y) is a constant offset to conform the safety requirement to fly over the subject. z<0 is also a preset constant, and |z| is the height above $\hat{P}_{sub}(t)$ so the camera's image is able to cover the complete subject's area.

First side camera (second camera) positioning:

$$(x_c^G(t), y_c^G(t), z_c^G(t)) = (X_{sub}(t), Y_{sub}(t), Z_{sub}(t)) + \vec{v(t)}$$

$$\vec{L_c^G(t)} = -\vec{v}/|\vec{v}|,$$

which determines $(\alpha_c^G(t), \beta_c^G(t), \gamma_c^G(t))$ of this camera.

$$\vec{v(t)} = (x_v^G(t), y_v^G(t), z_v^G(t)). \sqrt{|y_v^G(t)|^2 + |x_v^G(t)|^2} = d,$$

where d is a pre-calculated distance between the camera and the subject so the camera's image is able to cover the complete subject's area. The combination of $x_v^G(t)$, $y_v^G(t)$ is able to be arbitrary or determined by a specific facing criteria. $z_v^G(t) = Z_{sub}(t)$ or close to $Z_{sub}(t)$ such that the camera's image is able to cover the complete subject's area.

For the additional $n^{th}$ cameras, $n \geq 3$:

Let $\theta = \tan^{-1}(y_v^G(t)/x_v^G(t))$, $$(x_c^G(t), y_c^G(t), z_c^G(t),) = (X_{sub}(t), Y_{sub}(t), Z_{sub}(t)) +$$

$$\left(d\sin\left(\theta + \frac{(n-2)360°}{(N-1)+(N\%2)}\right), d\cos\left(\theta + \frac{(n-2)360°}{(N-1)+(N\%2)}\right), \delta_c(t)\right).$$

Let $\vec{v_c(t)} =$ $$\left(d\sin\left(\theta + \frac{(n-2)360°}{(N-1)+(N\%2)}\right), d\cos\left(\theta + \frac{(n-2)360°}{(N-1)+(N\%2)}\right), \delta_c(t)\right)$$

$$\vec{L_c^G(t)} = -\frac{\vec{v_c}}{|\vec{v_c}|}, \text{ which determines } (\alpha_c^G(t), \beta_c^G(t), \gamma_c^G(t)) \text{ of this camera.}$$

A side camera is positioned to avoid exact opposite (180°) viewing directions on the X-Y plane.

FIG. 7 illustrate exemplary diagrams of multiple drones positioned at varying angles according to some embodiments. Depending on the number of drones in use, the angles between the drones are modified.

In some embodiments, the swarm formation performs translation in the global coordinates. The second camera's $\vec{v(t)}$ is fixed to $(v_x, v_y, \delta)$, where $\delta$ is the predefined height difference between the camera and the subject's head such that the captured image by the camera is able to cover the complete body of the subject.

In some embodiments, head guidance is used to specify the second camera's $\vec{v(t)}$. Any face pose estimation methods are able to be used to identify the orientation of the face in 3D. The methods are able to be 2D face detection with eye and nose positioning on each drone camera, then the eyes and nose positions are triangulated in 3D by the multiple drones. The orientation of the face in 3D is able to be estimated by the face feature points. The methods are also able to use direct 3D face pose estimation from each single 2D face image by some 2D to 3D face pose inference model, and then the pose is optimized among all drones' pose estimates in the global coordinates. After the face pose is estimated, the unit vector of face orientation in the global coordinate is defined as $(f_x(t), f_y(t), f_z(t))$, then $\vec{v(t)}$ is set to $(-df_x(t), -df_y(t), \delta)$, where d is defined herein.

The pose-capturing formation described herein involves minimal communication between the drones or the GCS, because the broadcasted $\hat{P}_{sub}(t)$ is sufficient. For obtaining $\hat{P}_{sub}(t)$, the 3D tracking with subject position prediction is able to be done on the top drone. The top drone is able to serve as a specific tracking drone since its camera has the aerial view (e.g., by flying 10 meters above the subject), which is more accurate for tracking the subject on the X-Y (ground) plane than the side drone cameras. The top drone is also able to keep the subject accurately tracked in GPS-denied environments. In some embodiments, for simplicity, it is assumed the ground plane is parallel to the global coordinate's X-Y plane. If the ground is slanted, all of the side cameras' X-Y positions are able to be tilted by a slant angle about the Z-axis, centered at $\hat{P}_{sub}(t)$ for flight safety.

Figure 8:
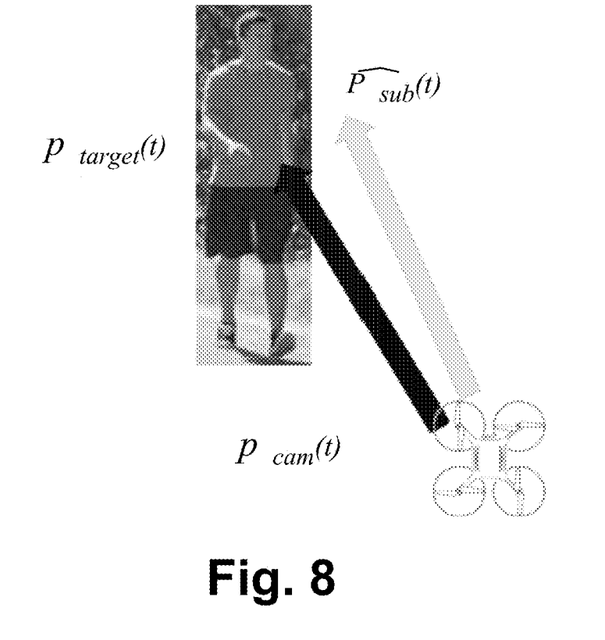
FIG. 8 illustrates a diagram of camera fine tuning according to some embodiments.

The drone formation emphasizes the effective viewpoints for 3D body part triangulation other than the coverage of a subject's volume. Each drone is fine tuned. As described in the U.S. patent Ser. No. 16/917,671, filed Jun. 30, 2020, titled, "METHOD OF MULTI-DRONE CAMERA CONTROL," fine tuning the drone (or more specifically the camera on the drone) is implemented. At time t, the location of the camera is:

$P_{cam}(t) \equiv (x_c^G(t), y_c^G(t), z_c^G(t))$, and the true location of the subject is $p_{target}(t)$. A 3D vector in the global coordinates from the camera to the target is: $\vec{v^G(t)} = p_{target}(t) - p_{cam}(t)$, and $\vec{v_u^G(t)} = \vec{v^G(t)}/\|\vec{v^G(t)}\|$. The control policy of the set of gimbal parameters, Gim, is set at time t to let $\vec{L_c^G(t)}$ approach $\vec{v_u^G(t)}$, that is:

$$Gim^*(t) = \underset{Gim(t)}{\arg\min} \left\| \vec{L_c^G(t)} - \vec{v_u^G(t)} \right\|.$$

FIG. 8 illustrates a diagram of camera fine tuning according to some embodiments.

By a control policy, the camera is moved by the gimbal to always keep the target in the image center (or at least attempt to). The implementation of gimbal control policy is mechanics-dependent for each gimbal.

Figure 9:
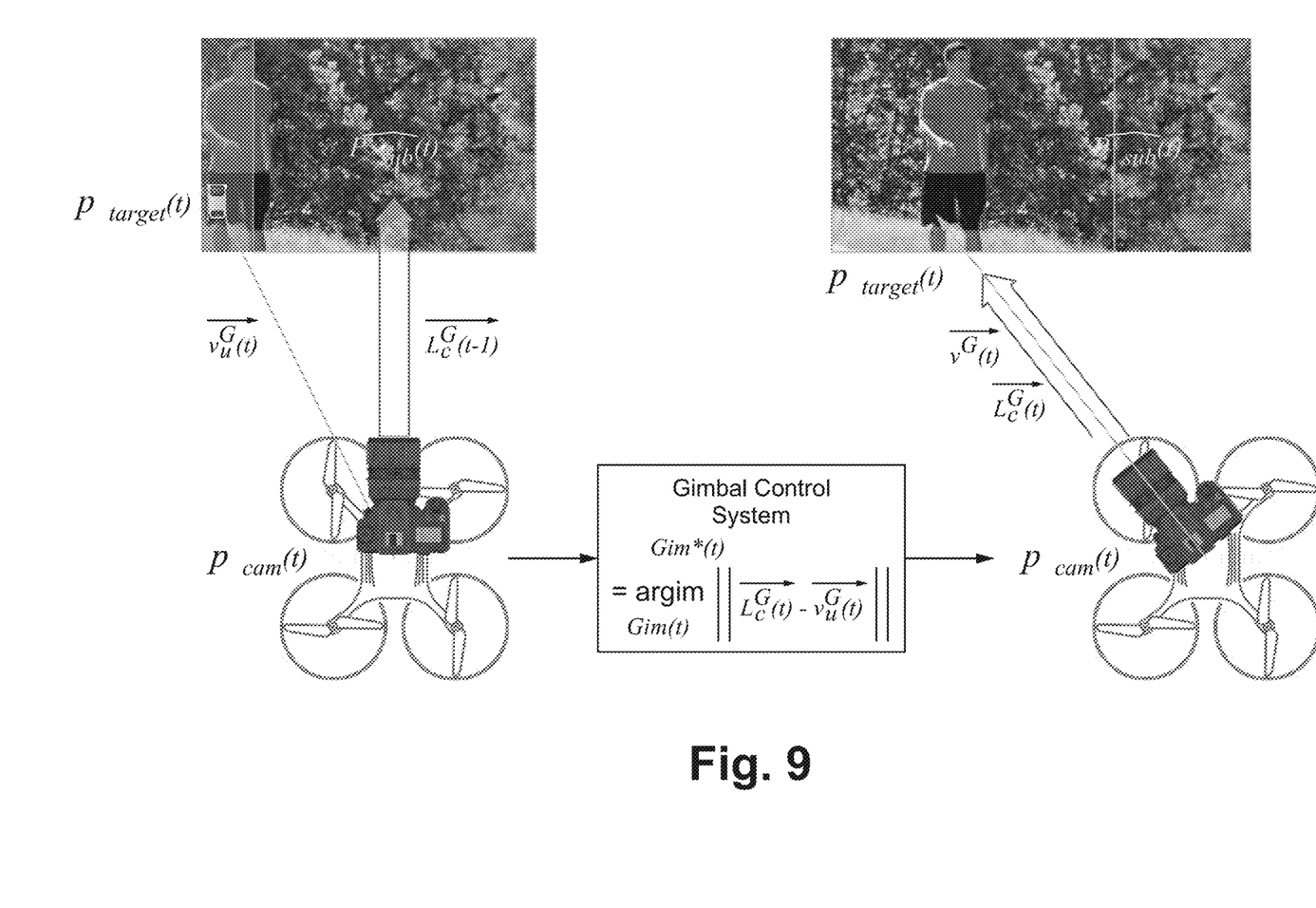
FIG. 9 illustrates a diagram of implementing a gimbal control system according to some embodiments.

FIG. 9 illustrates a diagram of implementing a gimbal control system according to some embodiments. The gimbal control system centers the target in the image.

Subject pose parameter estimation is implemented which uses offline subject 3D modeling. Offline subject 3D modeling is used to obtain the 3D model of the subject and other individual traits such as the biomechanical constraints. Subject pose parameter estimation involves 2D part positions and then 3D subject pose estimation. 2D part position determination is implemented on the drones and/or on the GCS. 3D subject pose estimation is performed on the GCS.

2D part positions are able to be used to perform or assist in performing 3D subject pose estimation. The part positions (e.g., joints, eyes, hands) in each camera image are determined. If the task is performed on the drones, then each drone sends the 2D part positions and the latest timestamps it received from all other drones back to the GCS. If the task is performed on the GCS, each drone sends each frame and the timestamps received from all other drones at this frame back to the GCS. In either implementation, the camera positions are sent back to the GCS.

3D subject pose estimation includes optimization with the following data: skeleton lengths, camera positions, 2D part positions in each camera image, and 2D/3D spatio-temporal smoothness constraint.

For subject pose parameter estimation, offline subject model building is implemented. To achieve higher accuracy, the subject's body parameters are measured before the capturing. The body parameters could include the length of skeleton between joints and biokinetic extrema of each joint the subject is able to perform. In general, 20-40 major body joints are used to control an avatar, with more measurements being better. The surface model of the subject is also able to be modeled by the subject's texture and shape. Given the surface model, it is possible to calculate or generate detailed expressions or actions for the avatar.

For subject pose parameter estimation, an exemplary implementation is described in U.S. patent application Ser. No. 62/782,862, titled, "PHOTO-VIDEO BASED SPATIAL-TEMPORAL VOLUMETRIC CAPTURE SYSTEM FOR DYNAMIC 4D HUMAN FACE AND BODY DIGITIZATION," which is hereby incorporated by reference in its entirety for all purposes. The exemplary implementation is about a system to build a human skeleton and surface model and then capture the spatio-temporal changes.

Subject pose parameter estimation in each 2D image is able to be performed using CNN-based, multi-subject methods. The estimation is able to be combined with prediction models for better tracking. If the computations are done on the GCS, the 2D image by each camera is sent to the GCS.

Embodiments of the pose parameters are able to be for sparse parts or dense parts, compatible with an avatar model. For sparse parts, one is able to use methods such as OpenPose or Mask R-CNN to position each major joint of each subject in an image in real-time. If the computations are done on a drone, then the 2D joint positions are sent to the GCS. For dense parts, an example is DensePose, which positions the elastic part surface in an image. If the computation is performed on a drone, all of the output images or part parameters are sent to the GCS. In DensePose, these are the patch, U, and V images.

For subject pose parameter estimation, the input includes: subject model parameter set M (e.g., the lengths of different body parts of the subject, the subject surface models, or the individual part's biokinetic motion limitations), the current time t, the total number of cameras N, the intrinsic parameters of camera c as $K_c$, camera c's pose in the global coordinates as $P_c^G(t)$, 2D part positions $p_j^c(t_c)$ of the subject in camera c's image coordinate with timestamp $t_c$, where j stands for the part index, and the history of $p_j^c(t_c)$ for all $t_c < t$.

The output of subject pose parameter estimation includes a 3D subject's pose parameter set A(t) at time t, for a sparse part-controlled avatar, an exemplar A(t) is the 6 degrees of freedom 3D position and rotation of each joint, and for a dense part-controlled avatar, an exemplar A(t) is the 3D vertex positions of the body surface mesh model.

In some instances, the view of the subject is obstructed or occluded, and a 3D pose is not able to be generated from the acquired data. A time-constrained 3D pose estimation using multiple drones is used for such conditions. The estimation sets a subject's 3D pose to be estimated at GCS at a period q with tolerance $\epsilon$, and the minimum number of cameras for triangulation is m, where m≥2. At an estimation time t, an inlier camera C is set to C=∅. For each drone camera c, if the latest received $p_j^c(t_c)$ has $t-t_c < \epsilon$, then C=C∪c. After all cameras are checked, if |C|<m, extrapolation is performed for the 3D parameter set at time t as A*(t) and output A*(t) for avatar control. Otherwise, if |C|≥m, for each drone camera c∈C, if $t_c<t$, extrapolation is performed for each 2D parameter at time t, which forms the estimated $\hat{p}_j^c(t)$ of any part j.

2D to 3D estimation uses $K=\cup K_c$ and $P(t)=\cup_{\forall c, \forall j} \hat{p}_j^c(t)$. The objective is to find the optimal A*(t) minimizing a loss function L:

$$A^*(t) = \underset{A(t)}{\mathrm{argmin}} L(A(t), M, C, K, P(t))$$

More specifically, L is defined as:

$$L(A(t),M,C,K,P(t))=w_{geo}E_{geo}(A(t),C,K,P(t))+w_{kin}E_{kin}(A(t),M)+w_{sm}E_{sm}(A(t),A_{his}),$$

where $E_{geo}$, $E_{kin}$, and $E_{sm}$ are the energy functions of 3D to 2D part reprojection error, deviations according to the biokinetic statistics, and the 3D temporal smoothness of part trajectories. $w_{geo}$, $w_{kin}$, and $w_{sm}$ are the corresponding weights of the energy terms. $A_{his}$ is the history of A earlier than t.

For data output, A*(t) is output for avatar control. A*(t) is added to $A_{his}$, and the oldest A(t) is removed from $A_{his}$ if it is not used by the future extrapolation. A*(t) and t are broadcast to all drones so each drone is able to use this information in the prediction model for 2D part positioning.

A*(t) is able to be solved by optimization methods, which are usually iterative, such as gradient descent, Gauss-Newton, or a variant of quasi-Newton methods such as L-BFGS. A*(t) may also be solved by an end-to-end DNN-based method by training a regression model with the output head containing A*(t). At inference, the computation is able to be done in one cycle without iterations.

Examples of implementations are able to be found in U.S. patent application Ser. No. 63/003,097, titled ML-BASED NATURAL HUMAN FACE/BODY ANIMATION USING VOLUMETRIC CAPTURE SYSTEM+MESH TRACKING, which is hereby incorporated by reference in its entirety for all purposes.

Figure 10:
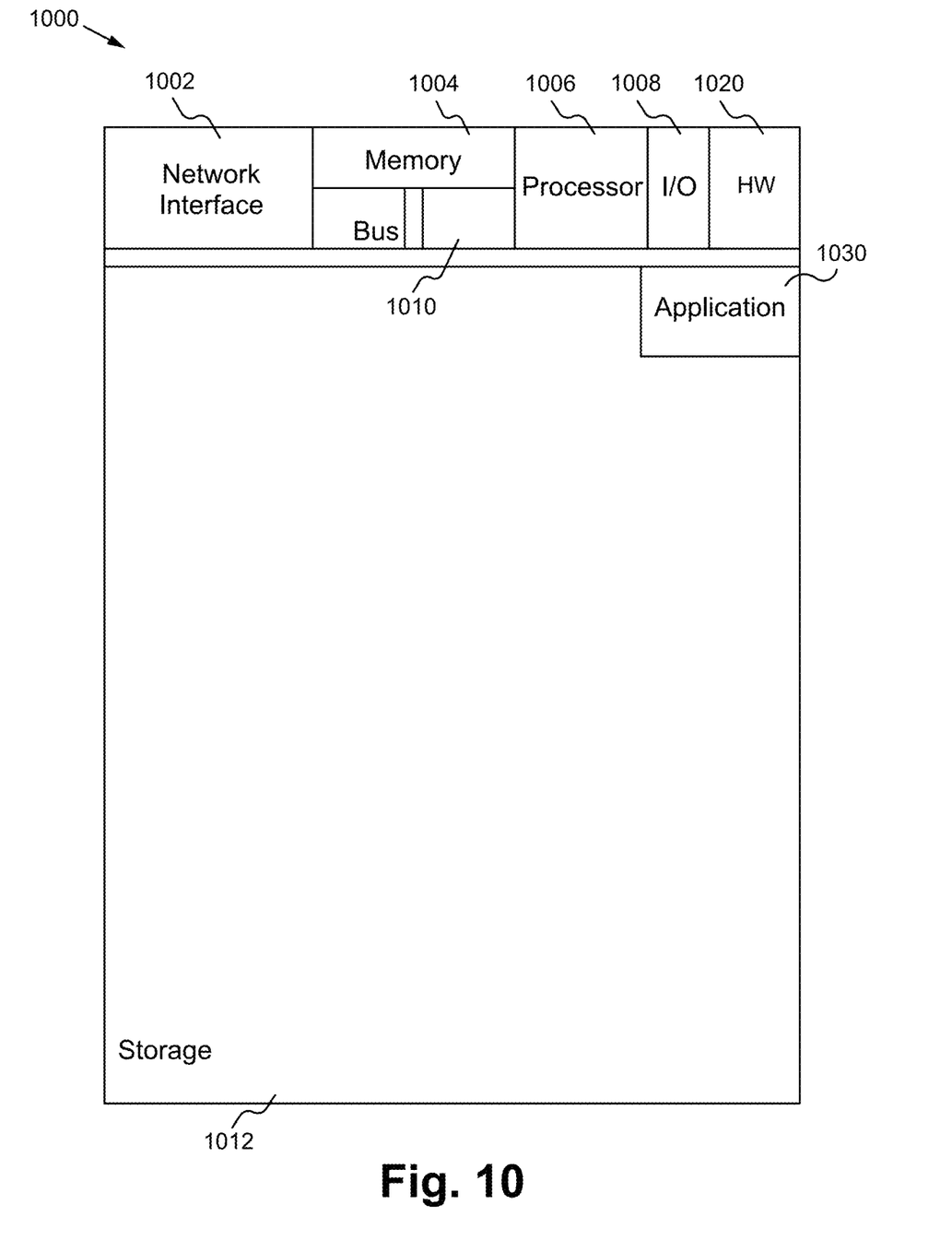
FIG. 10 illustrates a block diagram of an exemplary computing device configured to implement the drone-based 3D motion reconstruction method according to some embodiments.

FIG. 10 illustrates a block diagram of an exemplary computing device configured to implement the drone-based 3D motion reconstruction method according to some embodiments. The computing device 1000 is able to be used to acquire, store, compute, process, communicate and/or display information such as images and videos including 3D content. The computing device 1000 is able to implement any of the encoding/decoding aspects. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. A GPU is also able to be included. The memory 1004 is able to be any conventional computer memory known in the art. The storage device 1012 is able to include a hard drive, CDROM, CDRW, DVD, DVDRW, High Definition disc/drive, ultra-HD drive, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, screen, printer, modem, touchscreen, button interface and other devices. Drone-based 3D motion reconstruction application(s) 1030 used to implement the drone-based 3D motion reconstruction method are likely to be stored in the storage device 1012 and memory 1004 and processed as applications are typically processed. More or fewer components shown in FIG. 10 are able to be included in the computing device 1000. In some embodiments, drone-based 3D motion reconstruction hardware 1020 is included. Although the computing device 1000 in FIG. 10 includes applications 1030 and hardware 1020 for the drone-based 3D motion reconstruction implementation, the drone-based 3D motion reconstruction method is able to be implemented on a computing device in hardware, firmware, software or any combination thereof. For example, in some embodiments, the drone-based 3D motion reconstruction applications 1030 are programmed in a memory and executed using a processor. In another example, in some embodiments, the drone-based 3D motion reconstruction hardware 1020 is programmed hardware logic including gates specifically designed to implement the drone-based 3D motion reconstruction method.

In some embodiments, the drone-based 3D motion reconstruction application(s) 1030 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle), a drone, or any other suitable computing device.

Figure 11:
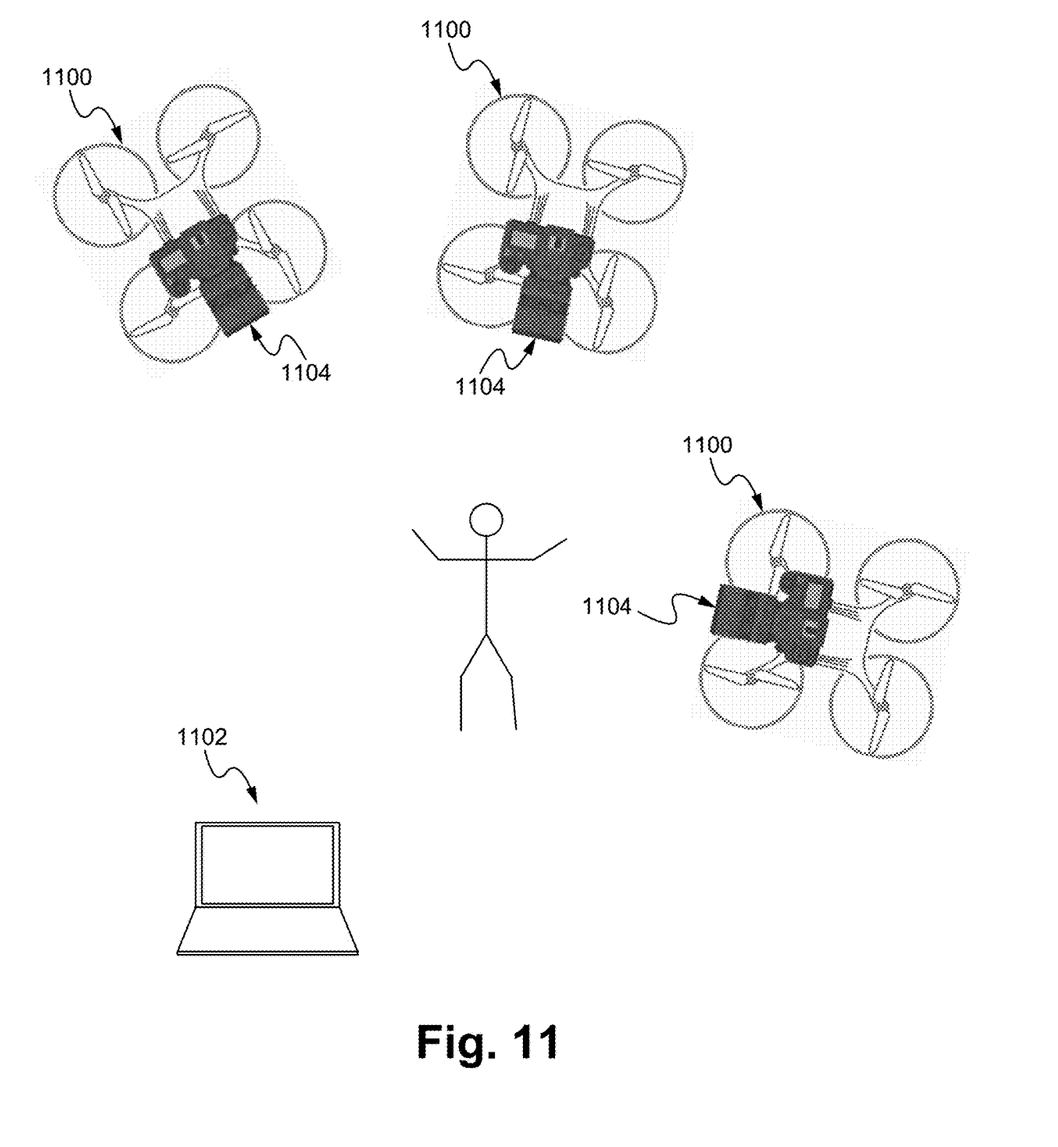
FIG. 11 illustrates a diagram of a system configured to implementing the drone-based 3D motion reconstruction method according to some embodiments.

FIG. 11 illustrates a diagram of a system configured to implementing the drone-based 3D motion reconstruction method according to some embodiments. In some embodiments, the system includes a set of drones 1100 and a GCS 1102. Each of the drones 1100 includes a camera 1104. The drones 1100 are able to include other features/components including additional cameras, sensors, gimbals, gyroscopes, and/or any other components. As described herein, the drones 1100 are configured to track, predict and be positioned with respect to a subject and each other so as to capture content (e.g., images/video) of the subject from many different angles. In some embodiments, at least one of the drones 1100 is positioned directly above (or above with an offset) the subject, and this drone is a control drone with additional features such as additional software features which enable the drone to communicate and process commands and information to the other drones. The GCS 1102 is configured to communicate with the drones 1100 and process content received from the drones 1100. The drones 1100 are configured to communicate with each other as well. As described herein, the drones 1100 and/or the GCS are able to perform the steps of the drone-based 3D motion reconstruction described herein. In some embodiments, instead of utilizing drones, another set of mobile camera devices are used.

To utilize the drone-based 3D motion reconstruction method, multiple drones acquire images and videos of a subject from a variety of angles. The multiple drones are configured to establish a position and track the subject. The drone-based 3D motion reconstruction method is able to be implemented with user assistance or automatically without user involvement (e.g., by utilizing artificial intelligence).

In operation, the drone-based 3D motion reconstruction method and system is able to track and follow motion of subjects. The method and system remove the restrictions of past motion capture systems including the space to capture, the location to capture and human-only subjects. For example, the restriction of a dedicated VR shooting place, "the hot seat," is removed, so the actor/target is able to perform agile or long-distance activities. The resultant pose parameters are used to manipulate an existing surface/volumetric VR actor model. The method is able to be directly integrated into an existing VR/AR production chain. The method and system do not require tremendous building efforts that are required by past motion capture systems. Furthermore, serious site investigation and planning, robust camera installation, complicated wiring, and area marking capturing are not required. The method and system are able to be utilized with studio-level VR/AR for movie or TV production, professional athlete or dancer remote training. The method and system are also able to be utilized for video conferencing, virtual Youtube, gaming, and motion replay (spatiotemporal album).

SOME EMBODIMENTS OF METHOD OF 3D RECONSTRUCTION OF DYNAMIC OBJECTS BY MOBILE CAMERAS

1. A method comprising:
   obtaining a 3D model of a subject generated using a multi-view capturing system;
   capturing motion of the subject while the subject is moving with a plurality of drones;
   estimating pose parameters of the subject using the captured motion from the plurality of drones; and
   applying the pose parameters to animate the 3D model.
2. The method of clause 1 further comprising positioning the subject within views of the plurality of drones by implementing 3D positioning directly.
3. The method of clause 1 further comprising positioning the subject within views of the plurality of drones by implementing 3D positioning indirectly from 2D.
4. The method of clause 1 further comprising using prediction to predict a future location of the subject to determine where to position the plurality of drones.
5. The method of clause 1 further comprising collecting the captured motion from the plurality of drones at a ground control station.
6. The method of clause 5 wherein the ground control station receives videos, positions, and timestamps from the plurality of drones, and sends any controlling or correction commands to the plurality of drones.
7. The method of clause 1 further comprising controlling drone formation of the plurality of drones with a ground control station.
8. The method of clause 1 further comprising controlling drone formation of the plurality of drones with a tracking drone of the plurality of drones.
9. The method of clause 1 wherein each camera of each drone of the plurality of drones is configured to broadcast absolute positions to all other cameras.
10. An apparatus comprising:
    a non-transitory memory for storing an application, the application for:
      obtaining a 3D model of a subject;
      receiving captured motion of the subject while the subject is moving from a plurality of drones;
      estimating pose parameters of the subject using the captured motion from the plurality of drones; and
      applying the pose parameters to animate the 3D model; and
    a processor coupled to the memory, the processor configured for processing the application.
11. The apparatus of clause 10 wherein the application is further configured for positioning the subject within views of the plurality of drones by implementing 3D positioning directly.
12. The apparatus of clause 10 wherein the application is further configured for positioning the subject within views of the plurality of drones by implementing 3D positioning indirectly from 2D.

13. The apparatus of clause 10 wherein the application is further configured for using prediction to predict a future location of the subject to determine where to position the plurality of drones.

14. The apparatus of clause 10 wherein the apparatus receives videos, positions, and timestamps from the plurality of drones, and sends any controlling or correction commands to the plurality of drones.

15. The apparatus of clause 10 wherein the application is further configured for controlling drone formation of the plurality of drones.

16. A system comprising:
a plurality of drones configured for capturing motion of a subject while the subject is moving; and
a ground control station configured for:
obtaining a 3D model of the subject generated using a multi-view capturing system;
estimating pose parameters of the subject using the captured motion from the plurality of drones; and
applying the pose parameters to animate the 3D model.

17. The system of clause 16 wherein each drone of the plurality of drones is equipped with at least one RGB camera device, wherein a camera's orientation is controllable by a gimbal attached to each drone of the plurality of drones.

18. The system of clause 16 wherein the plurality of drones are configured for positioning the subject within views of the plurality of drones by implementing 3D positioning directly.

19. The system of clause 16 wherein the plurality of drones are configured for positioning the subject within views of the plurality of drones by implementing 3D positioning indirectly from 2D.

20. The system of clause 16 wherein the plurality of drones are configured for using prediction to predict a future location of the subject to determine where to position the plurality of drones.

21. The system of clause 16 wherein the ground control station is configured for collecting the visual data from the plurality of drones.

22. The system of clause 16 wherein the ground control station is configured to receive videos, positions, and timestamps from the plurality of drones, and send any controlling or correction commands to the plurality of drones.

23. The system of clause 16 wherein the ground control station is configured to control drone formation of the plurality of drones.

24. The system of clause 16 wherein a tracking drone of the plurality of drones is configured for controlling drone formation of the plurality of drones.

25. The system of clause 16 wherein each camera of each drone of the plurality of drones is configured to broadcast absolute positions to all other cameras.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
obtaining a three-dimensional (3D) model of a subject generated using a multi-view capturing system;
capturing motion of the subject while the subject is moving with a plurality of drones;
estimating pose parameters of the subject using the captured motion from the plurality of drones, wherein estimating the pose parameters is based on one or more part positions including detecting one or more of joints, eyes and hands of the subject, wherein eye and nose positions are triangulated in 3D by the plurality of drones after performing 2D face detection with eye and nose positioning on each drone;
using prediction to predict a future location of the subject to determine where to position the plurality of drones, wherein prediction implements sequential pose estimations to predict a next subject position and adjust camera positions accordingly; and
applying the pose parameters to animate the 3D model.

2. The method of claim 1 further comprising positioning the subject within views of the plurality of drones by implementing 3D positioning directly.

3. The method of claim 1 further comprising positioning the subject within views of the plurality of drones by implementing 3D positioning indirectly from two-dimensional (2D).

4. The method of claim 1 further comprising collecting the captured motion from the plurality of drones at a ground control station.

5. The method of claim 4 wherein the ground control station receives videos, positions, and timestamps from the plurality of drones, and sends any controlling or correction commands to the plurality of drones.

6. The method of claim 1 further comprising controlling drone formation of the plurality of drones with a ground control station.

7. The method of claim 1 further comprising controlling drone formation of the plurality of drones with a tracking drone of the plurality of drones.

8. The method of claim 1 wherein each camera of each drone of the plurality of drones is configured to broadcast absolute positions to all other cameras.

9. An apparatus comprising:
a non-transitory memory for storing an application, the application for:
obtaining a three-dimensional (3D) model of a subject;
receiving captured motion of the subject while the subject is moving from a plurality of drones;
estimating pose parameters of the subject using the captured motion from the plurality of drones, wherein estimating the pose parameters is based on one or more part positions including detecting one or more of joints, eyes and hands of the subject, wherein eye and nose positions are triangulated in 3D by the plurality of drones after performing 2D face detection with eye and nose positioning on each drone;
using prediction to predict a future location of the subject to determine where to position the plurality of drones, wherein prediction implements sequential pose estimations to predict a next subject position and adjust camera positions accordingly; and
applying the pose parameters to animate the 3D model; and
a processor coupled to the memory, the processor configured for processing the application.

10. The apparatus of claim 9 wherein the application is further configured for positioning the subject within views of the plurality of drones by implementing 3D positioning directly.

11. The apparatus of claim 9 wherein the application is further configured for positioning the subject within views of the plurality of drones by implementing 3D positioning indirectly from two-dimensional (2D).

12. The apparatus of claim 9 wherein the apparatus receives videos, positions, and timestamps from the plurality of drones, and sends any controlling or correction commands to the plurality of drones.

13. The apparatus of claim 9 wherein the application is further configured for controlling drone formation of the plurality of drones.

14. A system comprising:
a plurality of drones configured for:
capturing motion of a subject while the subject is moving; and
using prediction to predict a future location of the subject to determine where to position the plurality of drones, wherein prediction implements sequential pose estimations to predict a next subject position and adjust camera positions accordingly; and
a ground control station configured for:
obtaining a three-dimensional (3D) model of the subject generated using a multi-view capturing system;
estimating pose parameters of the subject using the captured motion from the plurality of drones, wherein estimating the pose parameters is based on one or more part positions including detecting one or more of joints, eyes and hands of the subject, wherein eye and nose positions are triangulated in 3D by the plurality of drones after performing 2D face detection with eye and nose positioning on each drone; and
applying the pose parameters to animate the 3D model.

15. The system of claim 14 wherein each drone of the plurality of drones is equipped with at least one RGB camera device, wherein a camera's orientation is controllable by a gimbal attached to each drone of the plurality of drones.

16. The system of claim 14 wherein the plurality of drones are configured for positioning the subject within views of the plurality of drones by implementing 3D positioning directly.

17. The system of claim 14 wherein the plurality of drones are configured for positioning the subject within views of the plurality of drones by implementing 3D positioning indirectly from two-dimensional (2D).

18. The system of claim 14 wherein the ground control station is configured for collecting the visual data from the plurality of drones.

19. The system of claim 14 wherein the ground control station is configured to receive videos, positions, and timestamps from the plurality of drones, and send any controlling or correction commands to the plurality of drones.

20. The system of claim 14 wherein the ground control station is configured to control drone formation of the plurality of drones.

21. The system of claim 14 wherein a tracking drone of the plurality of drones is configured for controlling drone formation of the plurality of drones.

22. The system of claim 14 wherein each camera of each drone of the plurality of drones is configured to broadcast absolute positions to all other cameras.

* * * * *